(12) United States Patent
Ikeda et al.

(10) Patent No.: US 8,816,538 B2
(45) Date of Patent: Aug. 26, 2014

(54) ELECTRIC JUNCTION BOX AND POWER SUPPLY DEVICE HAVING THE SAME

(75) Inventors: Tomohiro Ikeda, Shizuoka (JP); Yoshinobu Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 827 days.

(21) Appl. No.: 12/923,647

(22) Filed: Sep. 30, 2010

(65) Prior Publication Data

US 2011/0080058 A1    Apr. 7, 2011

(30) Foreign Application Priority Data

Oct. 1, 2009  (JP) ................................. 2009-229903

(51) Int. Cl.
  *H02B 1/20*     (2006.01)
  *H02B 1/26*     (2006.01)

(52) U.S. Cl.
  CPC ... *H02B 1/20* (2013.01); *H02B 1/26* (2013.01)
  USPC ........................................................ 307/150

(58) Field of Classification Search
  CPC ................................... H02B 1/20; H02B 1/26
  USPC ........................................................ 307/150
  See application file for complete search history.

(56) References Cited

U.S. PATENT DOCUMENTS

| | | | |
|---|---|---|---|
| 5,882,213 A * | 3/1999 | Witek et al. | 439/76.2 |
| 7,291,025 B2 * | 11/2007 | Yagi et al. | 439/76.2 |
| 8,207,454 B2 * | 6/2012 | Darr et al. | 174/520 |
| 2004/0043646 A1 | 3/2004 | Takeuchi et al. | |
| 2005/0233619 A1 | 10/2005 | Takeuchi et al. | |
| 2006/0291526 A1 | 12/2006 | Yagi et al. | |

FOREIGN PATENT DOCUMENTS

| JP | 2004-096861 A | 3/2004 |
|---|---|---|
| JP | 2006-311755 A | 11/2006 |

\* cited by examiner

*Primary Examiner* — Adi Amrany
(74) *Attorney, Agent, or Firm* — Edwards Wildman Palmer LLP; James E. Armstrong, IV; Stephen D. LeBarron

(57) ABSTRACT

An electric junction box, having a terminal portion positioned in the connector engagement portion and arranged perpendicular to a direction along which case members attach each other, which can be assembled easily without increasing the number of components and manufacturing cost is provided. Also, a power supply device having the above-described electric junction box is provided. The electric junction box includes: a box main body having a connector engagement portion and an upper case attached to a lower case in an overlapping relationship; and a bus bar received in the box main body. The lower case includes a bottom wall portion, a positioning wall and peripheral walls. The bus bar includes the terminal portion positioned in the connector engagement portion, a positioning plate portion and a mount portion. The peripheral wall includes a cutout portion allowing the positioning plate portion to move into and out from the lower case.

6 Claims, 4 Drawing Sheets

ELECTRIC JUNCTION BOX AND POWER SUPPLY DEVICE HAVING THE SAME

CROSS REFERENCE TO RELATED APPLICATION

The priority application Japan Patent Application No. 2009-229903 upon which this patent application is based is hereby incorporated by reference.

BACKGROUND OF THE INVENTION

1. Field of the Invention

The present invention relates to an electric junction box mounted for example to a motor vehicle as a moving body. The present invention also relates to a power supply device having the above-described electric junction box.

2. Description of the Related Art

Conventionally, for example in an electric vehicle propelled by an electric motor or a hybrid vehicle propelled by a combination of an internal-combustion engine and an electric motor, various power supply devices are applied as a power supply device for the electric motor. The power supply device of this kind is provided with a battery assembly having a plurality of batteries connected to each other in series and an electric junction box which outputs electric power, the electric power being temporary supplied from the battery assembly, to an inverter as external electric equipment via a relay (refer for example to Japanese Patent Application Publication No. 2004-96861 and Japanese Patent Application Publication No. 2006-311755).

The above-described electric junction box includes component mounting portions to which relays (as electric components) are mounted, a box main body having a connector engagement portion with which a connector of a wire harness wired in the vehicle is engaged, the wire harness being connected to various electric equipment, and a wiring unit received inside of the box main body and electrically connecting the relays and the connector and such according to a predetermined pattern.

The box main body includes a lower case (as a case member) and an upper case (as a case member) attached to the lower case and having the component mounting portions and the connector engagement portion. The lower case and the upper case are attached to each other in an overlapping relationship so as to receive thereinside the wiring unit.

The wiring unit includes a plurality of bus bars made of conductive metal. The bus bar is constituted of conductive metal that has been subjected to punching and bending and formed into a band-plate-like shape having a predetermined pattern. Some of the bus bars of the plurality of bus bars include a terminal portion to be positioned inside of the connector engagement portion. Furthermore, some of the bus bars of the plurality of bus bars include an electric power supply portion connecting to the battery assembly to be supplied with electric power therefrom.

The above-described electric junction box is assembled such that the wiring unit is received inside of the box main body. Then the connector is engaged with the connector engagement portion and the relays are mounted to the component mounting portions. The assembled electric junction box is then mounted to the battery assembly to be mounted to the vehicle.

SUMMARY OF THE INVENTION

Technical Problem

The electric junction box disclosed in the above-mentioned prior arts may be, depending on a mounting condition to the vehicle, mounted to the vehicle such that the terminal portion of the bus bar is arranged parallel to a direction perpendicular to a direction along which the lower case and the upper case are attached to each other in an overlapping relationship. In other words, the connector is required to be moved along the direction perpendicular to the direction along which the lower case and the upper case are overlapped with respect to each other to be engaged with the connector engagement portion.

In this case, the terminal portion is arranged parallel to the direction perpendicular to the direction along which the lower case and the upper case are overlapped with respect to each other. Thus, when mounting the bus bar to the lower case, it is difficult to position the bus bar at a proper position by simply disposing the bus bar on the lower case, or for example by sandwiching the bus bar between walls provided at the lower case. Such difficulty in positioning the bus bar at a proper position at the lower case causes an increase in the manufacturing cost.

In addition, the bus bar can be divided into separate pieces to make it easy to properly position the terminal portion thereof; however, this can cause an increase in the number of bus bars and thus increases the number of components. In addition, in this case, the manufacturing cost required to fix the bus bars to the lower case also increases.

The present invention is intended to address these problems. Thus, an object of the present invention is to provide an electric junction box which can be assembled easily without increasing the number of components even if the terminal portion in the connector engagement portion is arranged perpendicular to the direction along which the lower case and the upper case are attached to each other in an overlapping relationship.

Solution to Problem

In order to solve the above-described problems and achieve the above-described object, according to one aspect of the present invention, there is provided an electric junction box including: a box main body constituted of two case members attached to each other in an overlapping relationship and provided with connector engagement portions to be engaged with connectors; and a bus bar positioned inside of the connector engagement portion and provided with a terminal portion arranged parallel to a direction perpendicular to a direction along which the two case members are overlapped with respect to each other. One case member of the two case members includes a bottom wall portion, a positioning wall extending perpendicularly from a central portion of the bottom wall portion, and a peripheral wall extending perpendicularly from an outer edge of the bottom wall portion. In addition, the bus bar includes a positioning plate portion connecting to the terminal portion and arranged parallel to the positioning wall and a mount portion connecting to the positioning plate portion and arranged parallel to the bottom wall portion. In addition, the peripheral wall includes a cutout portion allowing the positioning plate portion to move into and out from the one case member.

According to the electric junction box of the present invention described above, the one case member includes the positioning wall extending perpendicularly from the central portion of the bottom wall portion and the peripheral wall extending perpendicularly from the outer edge of the bottom wall portion and having the cutout portion. Also, the bus bar includes the positioning plate portion and the mount portion to be disposed on the bottom wall portion. Thus, the bus bar can be properly positioned and attached to the one case member by disposing the mount portion of the bus bar on the bottom wall and by moving the positioning plate portion of the positioning wall.

Consequently, even if the terminal portion in the connector engagement portion is arranged parallel to a direction perpendicular to a direction along which the case members are attached to each other in an overlapping relationship, the assembly of the electric junction box can be facilitated without increasing the number of components and the manufacturing cost.

Furthermore, according to the present invention, the other case member of the two case members includes a pushing portion. The pushing portion is arranged such that when attaching the two case members to each other, the pushing portion abuts on the positioning plate portion and pushes the positioning plate portion against the positioning wall, and when the two case members are attached to each other, the positioning plate portion is sandwiched between the pushing piece and the positioning wall.

According to the above-described electric junction box, the other case member includes the pushing portion pushing the positioning plate portion towards the positioning wall. Thus, the positioning plate portion can be moved towards the positioning wall by attaching the two case members. Furthermore, since the pushing portion sandwiches the positioning plate portion between the pushing portion and the positioning wall, the bus bar can be positioned properly by attaching the two case members to each other. Consequently, the assembly of the electric junction box can be facilitated without increasing the number of components and the manufacturing cost.

Furthermore, according to the present invention, the pushing portion includes an inclined face arranged to abut on the positioning plate portion when attaching the two case members to each other, and arranged to incline so that a portion on the inclined face gets away from the positioning wall as the portion on the inclined face gets closer to the one case member.

According to the above-described electric junction box, since the pushing portion includes the inclined face inclined so that a portion on the inclined face gets away from the positioning wall as the portion on the inclined face gets closer to the one case member, the pushing portion can reliably push the positioning plate portion against the positioning wall when attaching the case members to each other. Consequently, the electric junction box can be assembled even more reliably and easily.

Furthermore, according to the present invention, there is provided a power supply device including: a battery assembly having a plurality of batteries connected to each other in series; and the electric junction box described above outputting electric power supplied from the battery assembly to electric equipment.

According to the above-described power supply device, since the power supply device includes the above-described electric junction box described above, the assembly of the power supply device can also be facilitated without increasing the number of components and the manufacturing cost.

DETAILED DESCRIPTION OF THE PREFERRED EMBODIMENTS

An electric junction box and a power supply device according to one embodiment of the present invention are explained below in reference with FIG. 1 through FIG. 7. A power supply device 1 according to one embodiment of the present invention is mounted for example to an electric vehicle propelled by an electric motor or to a hybrid vehicle propelled by a combination of an internal-combustion engine and an electric motor to supply power to the electric motor.

Figure 1:
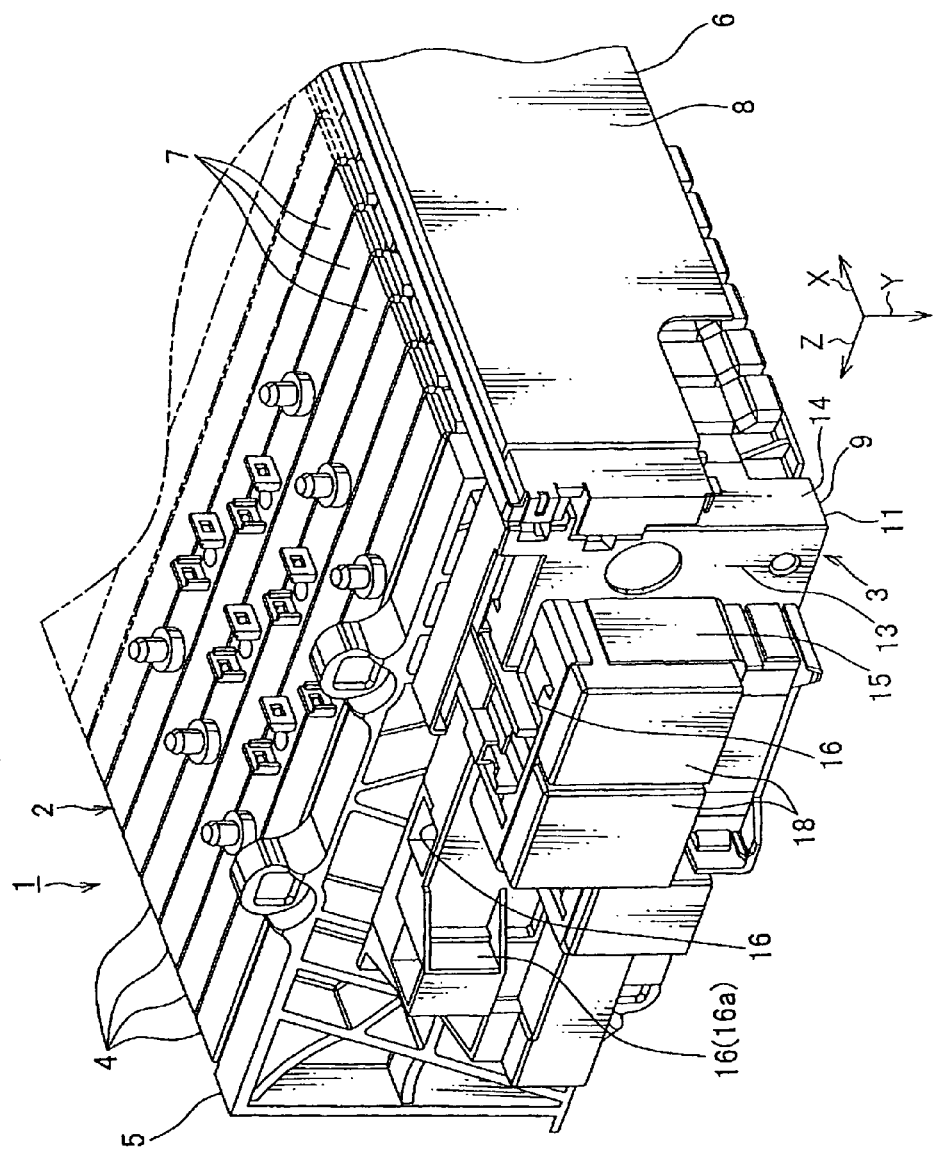
FIG. 1 is a perspective view showing a portion of a power supply device according to one embodiment of the present invention.

As shown in FIG. 1, the power supply device 1 according to this embodiment includes a battery assembly 2 and an electric junction box 3 mounted to the battery assembly 2.

The battery assembly 2, as shown in FIG. 1, includes a plurality of batteries 4, a pair of end plates 5 (only one of the end plates 5 is shown) fixing the batteries 4 so the batteries 4 are aligned adjacent to each other in an overlapping relationship (thus the batteries 4 are bundled together and fixed by the end plates 5), and a pair of bus bar modules 6 (one of the bus bar modules 6 is shown).

The respective batteries 4 include a thick plate-like battery main body 7, a positive electrode provided at one of end faces of the battery main body 7 at right and left hand sides in FIG. 1 and a negative electrode provided at the other one of the above-described end faces of the battery main body 7.

The batteries 4 are aligned adjacent to each other in an overlapping relationship such that the positive electrode and the negative electrode of the adjacent batteries 4 are arranged adjacent to each other. That is, the plurality of the batteries 4 is arranged adjacent to each other so the positive electrode and the negative electrode thereof are positioned alternately.

The respective end plates 5 are made of insulating material and formed into a thick plate-like shape. The respective end plates 5 of the pair are arranged so as to sandwich the plurality of batteries 4 therebetween in an overlapping relationship. In addition, the pair of end plates 5 are fixed to each other together with the plurality of batteries 4 sandwiched therebetween via bolts and nuts (not shown).

The respective bus bar modules 6 include a plate 8 made of insulating synthetic resin and a plurality of conductive bus bars. The plates 8, i.e. the bus bar modules 6, are disposed adjacent to the end faces of the batteries 4 on both sides. The bus bar mounted to the plate 8 connects the electrodes of the adjacent batteries to each other. That is, the bus bar modules 6 connect the adjacent batteries to each other in series. Furthermore, one of the bus bar modules 6 at right hand side in FIG. 1 includes: a connecting bus bar for a connection between the electric junction box 3 and the electrode of the battery 4 located at one end of the plurality of batteries 4 connected to each other in series; and a connecting cable for a connection between the electric junction box 3 and the electrode of the battery 4 located at the other end of the plurality of batteries 4 connected to each other in series.

The above-described bus bar modules 6 connect the plurality of batteries 4 to each other in series and further connect the plurality of batteries 4 to the electric junction box 3, thereby supplying power supplied from the plurality of batteries 4 connected in series to the electric junction box 3.

In FIG. 1, a X-direction corresponds to a direction along which the plurality of batteries 4 are aligned as well as an attachment direction of an upper case 11 and a lower case 12 described hereinafter, a Z-direction corresponds to the width direction of the battery assembly 2 and a Y-direction corresponds to the height direction of the battery assembly 2.

Figure 2:
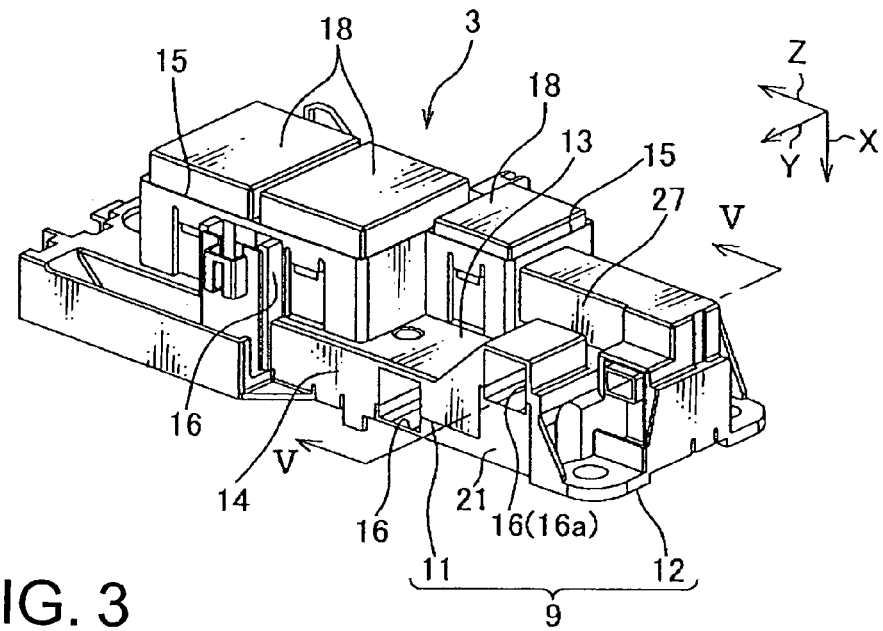
FIG. 2 is a perspective view of an electric junction box of the power supply device shown in FIG. 1.

The electric junction box 3 is disposed on and attached to one of the end plates 5 located in front side in FIG. 1. The electric junction box 3, as shown in FIG. 2 and FIG. 3, includes a box main body 9 and a wiring unit 10 (shown in FIG. 3).

The box main body 9 includes the upper case 11 and the lower case 12 which are to be attached to each other. These cases 11, 12, corresponding to case members described in claims, are made of insulating synthetic resin and are formed by a known injection molding. The upper case 11 corresponds to one case member described in claims and the lower case 12 corresponds to the other case member described in claims.

Figure 3:
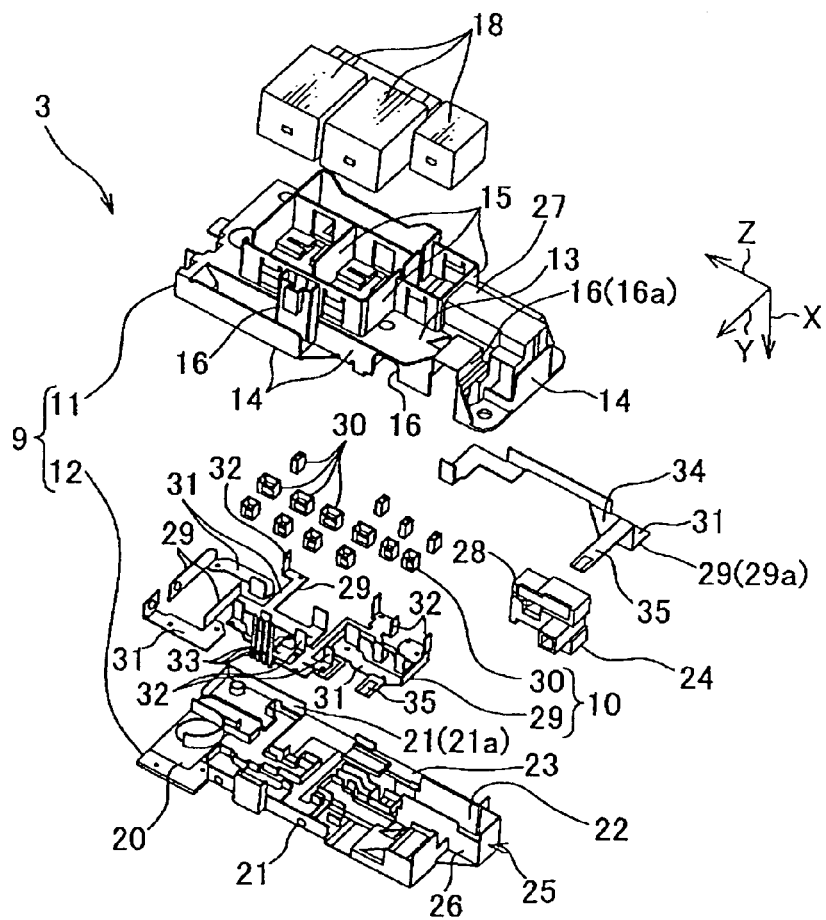
FIG. 3 is an exploded perspective view of the electric junction box shown in FIG. 2.
Figure 4:
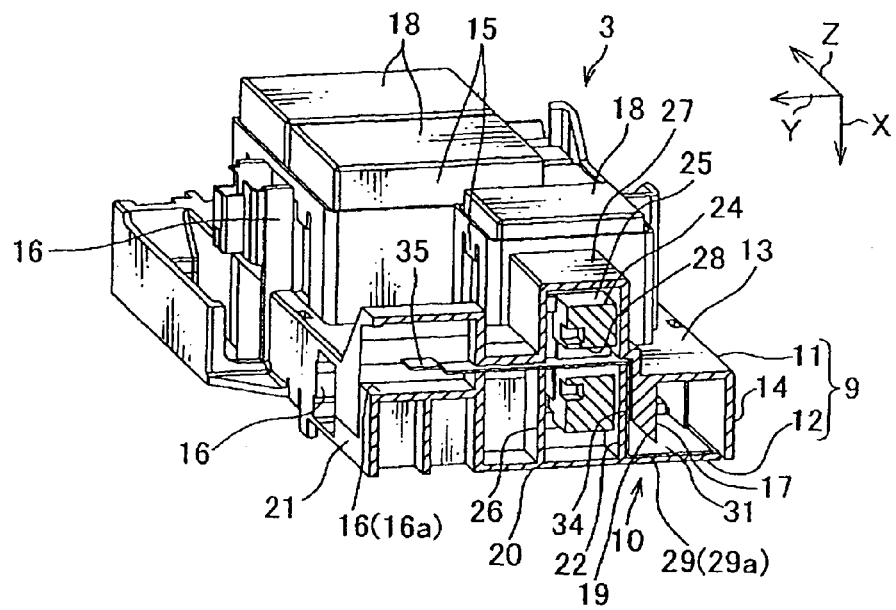
FIG. 4 is a perspective view showing cross section of a portion of the electric junction box shown in FIG. 2.
Figure 5:
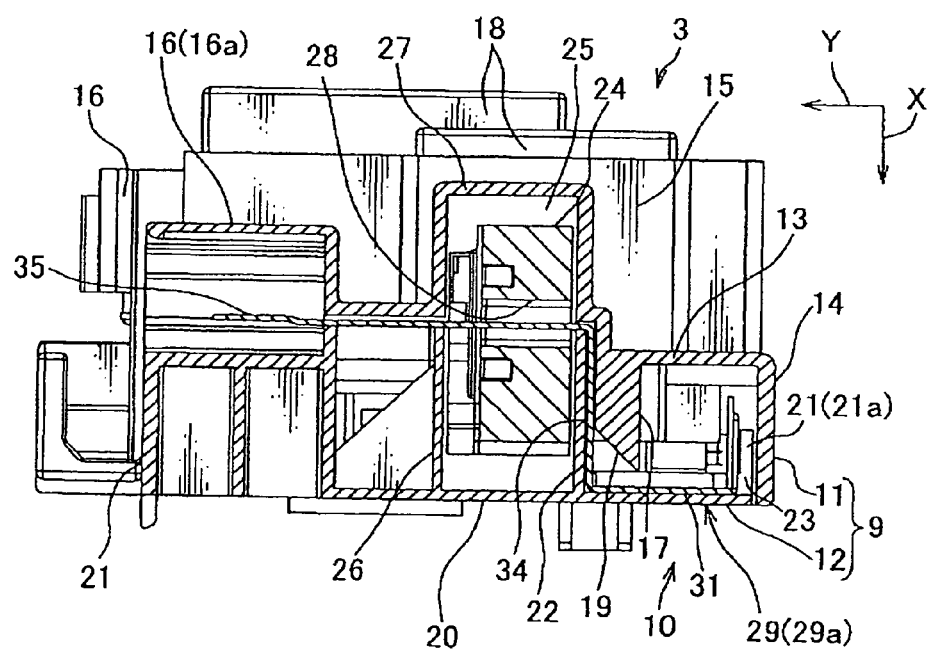
FIG. 5 is a cross-sectional view taken along a V-V line shown in FIG. 2.

The upper case 11, as shown in FIG. 3 through FIG. 5, includes an upper wall 13, peripheral walls 14 extending perpendicularly from an outer edge of the upper wall 13, a plurality of relay mounting portions 15 (correspond to component mounting portions), a plurality of connector engagement portions 16 and a pushing piece 17 (corresponds to a pushing portion). The relay mounting portions 15 are provided to the upper wall 13. Relays 18 are mounted to the relay mounting portions 15.

The connector engagement portion 16 is formed into a tubular shape and is provided to at least one of the upper wall 13 and the lower case 12. One connector engagement of the connector engagement portions 16 extends perpendicularly from the upper wall 13. This one connector engagement portion 16 engages with a connector of a wire harness (not shown) for activating the relays 18.

Other two connector engagement portions of the connector engagement portions 16 are arranged parallel with a surface of the upper wall 13 of the upper case 11. One of these other two connector engagement portions 16 (hereinafter indicated with a reference sign 16a) engages with a connector (not shown) provided at an end of a cable connecting with an inverter (electric equipment) and supplying power of the battery assembly 2 to the inverter. The other one of these other two connector engagement portions 16 engages with a connector (not shown) connecting with an ECU (Electronic Control Unit) which measures a current value detected by a later-described current sensor 24.

The pushing piece 17 is arranged at a central portion of the upper wall 13 and adjacent to the connector engagement portion 16. The pushing piece 17 extends perpendicularly from the upper wall 13 towards the bottom wall 20 and is formed into a band-plate-like shape having both surfaces thereof parallel to a longitudinal direction of a terminal portion 35 of a later-described bus bar 29a. When the upper case 11 is attached to the lower case 12, the pushing piece 17 is positioned between a peripheral wall 21a having a later-described cutout portion 23 (shown in FIG. 5) and the connector engagement portion 16. The pushing piece 17 is provided with an inclined face at a tip end portion thereof adjacent to the bottom wall 20. The inclined face 19 is formed flat and is inclined to the X-direction such that a portion on the inclined face 19 gets away from a later-described positioning wall 22 as it gets closer to the bottom wall 20 of the lower case 12.

The lower case 12, as shown in FIG. 3 through FIG. 5, includes the bottom wall 20 (bottom wall portion), peripheral walls 21 extending perpendicularly from an outer edge of the bottom wall 20 and the positioning wall 22 extending perpendicularly from a central portion of the bottom wall 20. The positioning wall 22 is arranged to extend in an orthogonal direction with respect to a surface of the bottom wall 20. The positioning wall 22 is arranged adjacent to the connector is engagement portion 16 and is arranged so both surfaces thereof are perpendicular to the longitudinal direction of the terminal portion 35. The positioning wall 22 is provided between the peripheral wall 21a having the cutout portion 23 (shown in FIG. 5) and the connector engagement portion 16a. Furthermore, the positioning wall 22 is arranged adjacent to the pushing piece 17 and is positioned closer to the connector engagement portion 16 than is the pushing piece 17. Furthermore, one of the peripheral walls 21 (hereinafter indicated by a reference sign 21a) includes the cutout portion 23 formed by cutting out the peripheral portion 21a, as shown in FIG. 5. The cutout portion 23 allows a later-described positioning plate portion 34 of the bus bar 29a to move into and out from the lower case 12 by sliding the bus bar 29a on the bottom wall 20.

The lower case 12 and the upper case 11 are attached to each other by first positioning the bottom wall 20 and the upper wall 13 in parallel to each other, and then moving these cases 11, 12 towards each other along a direction perpendicular to both of the bottom wall 20 and the upper wall 13, such that the peripheral portions 14, 21 (or one of the peripheral portions 14, 21) abut on the upper wall 13 or on the bottom wall 20, and such that the upper wall 13 and the bottom wall 20 are arranged parallel to each other with a space between each other.

These cases 11, 12 attached to each other in an overlapping relationship (i.e. the box main body 9) are mounted to the battery assembly 2 so the bottom wall 20 is disposed on the one of the end plates 5. In this manner, the box main body 9, i.e. the electric junction box 3, is mounted to the battery assembly 2 so as to be aligned with the battery assembly 2 along the X-direction along which the plurality of batteries 4 are aligned.

Furthermore, these cases 11, 12 include a sensor mounting portion 25 (shown in FIG. 5) for mounting the current sensor 24 detecting an electric current value flowing in the terminal portion 35. The sensor mounting portion 25 corresponds to a space formed between the cases 11, 12 when these cases 11, 12 are attached to each other. The sensor mounting portion 25 is constituted by being surrounded by the positioning wall 22, a partition wall 26 extending between the bottom wall 20 of the lower case 12 and the positioning wall 22 of the connector engagement portion 16, a concaved wall 27 concaved from the upper wall 13 of the upper case 11 and facing to both the positioning wall 22 and the partition wall 26. The sensor mounting portion 25 receives the current sensor 24 between the positioning wall 22, the partition wall 26 and the concaved wall 27. The current detector 24 includes a through hole 28 for passing the terminal portion 35 therethrough. The current detector 24 measures a current value of a current flowing in the terminal portion 35 by detecting the magnetic flux density around the terminal portion 35.

The wiring unit 10, as shown in FIG. 3, includes the plurality of bus bars 29 and a plurality of connection terminals 30. The respective bus bars 29 are constituted of conductive metal that has been subjected to punching and bending. The respective bus bars 29 include mount portions 31 to be mounted on the surface of the bottom wall 20 of the lower case 12, i.e. on the box main body 9. Some of these bus bars 29 include a projecting piece 32 extending perpendicularly from the mount portion 31 and a plurality of terminals 33 extending perpendicularly from the mount portion 31. The plurality of terminals 33 are to be positioned inside of the above-described one of the connector engagement portions 16.

The mount portions 31 are disposed on the bottom wall 20 of the lower case 12 and are attached to the lower case 12. The projecting piece 32 extends perpendicularly from the mount portion 31 towards the relay 18 mounted to the relay mounting portion 15. The terminals 33 extend perpendicularly from the mount portions 31 and are arranged to be positioned inside of the above-described one of the connector engagement portions 16.

One of the bus bars 29 (hereinafter indicated by a reference sign 29a) integrally includes, in addition to the mount portion 31, a positioning plate portion 34 and a terminal portion 35, as shown in FIG. 4 and FIG. 5. The positioning plate portion 34 extends perpendicularly from the mounting portion 31. Furthermore, the positioning plate portion 34 is arranged so that when the mount portion 31 of the bus bar 29a is disposed on the bottom wall 20, the positioning plate portion 34 is parallel to the positioning wall 22 and is disposed on the positioning wall 22.

The terminal portion 35 connects to the positioning plate portion 34 and extends perpendicularly from the positioning plate portion 34 in parallel with the mount portion 31. Furthermore, a longitudinal direction of the terminal portion 35 intersects with the X-direction (orthogonally, in the drawings) along which the cases 11, 12 are attached to each other in an overlapping relationship. When the mount portion 31 is disposed on the bottom wall 20 and the positioning plate portion 34 is disposed on the positioning wall 22, the terminal portion 35 is positioned inside of the above-described connector engagement portion 16a. When the connector connecting with the inverter is engaged with the connector engagement portion 16a, the terminal portion 31 connects with the terminal of this connector.

Furthermore, the bus bar 29a is supplied with power from the battery assembly 2 via the relays 18 and such. The bus bar 29a is attached to the lower case 12 by first positioning the mount portion 31 parallel to the surface of the bottom wall 20 and then moving the positioning plate portion 34 towards the wall 22 along a longitudinal direction of the terminal portion 31 and passing the positioning plate portion 34 through the cutout portion 23, thereby receiving the positioning plate portion 34 in of the lower case 12.

Furthermore, another one of the above-described bus bars 29 includes the mount portion 31 and the terminal portion 35. The terminal portion 35 is positioned inside of the above-described other one of the other two connector engagement portions 16 and engages with the connector (not shown) connecting with the ECU.

The respective connection terminal 30 are attached to the projecting piece 32, i.e. the bus bar 29, and a terminal of the relay 18 mounted to the repay mounting portion 15, thereby connecting the projecting pieces 32 and the relays 18 to each other.

The wiring unit 10 described above connects the battery assembly 2 with the relays 18 and such according to a predetermined pattern, and thereby outputs power supplied from the battery assembly 2 to the inverter via the relays 18 and the terminal portion 35. Furthermore, the wiring unit 10 connects the relays 18 with the connector of the wire harness (not shown) for activating the relays 18.

Figure 6:
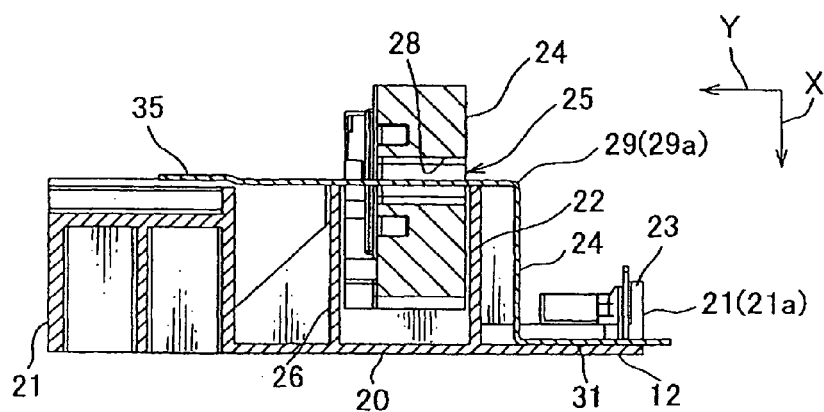
FIG. 6 is a cross-sectional view showing a lower case of the electric junction box shown in FIG. 2 in which a current sensor is attached to the lower case and a mount portion of a bus bar is disposed on a bottom wall of the lower case.
Figure 7:
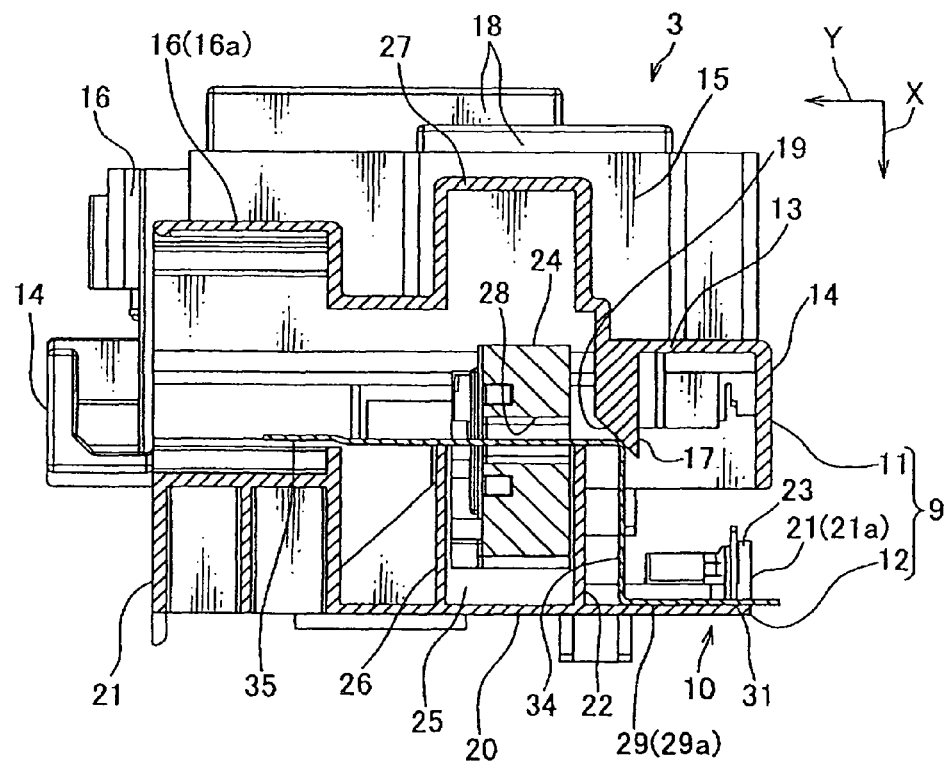
FIG. 7 is a cross sectional view showing the lower case shown in FIG. 6 with an upper case attached thereto.

The assembly of the electric junction box 3 having the above-described structure is explained below. For the above-described electric junction box 3, as shown in FIG. 6, the current sensor 24 is mounted to the sensor mounting portion 25 of the lower case 12, and then the positioning plate portion 34 is passed through the cutout portion 23 thereby disposing the mount portions 31 of the bus bars 29a on the bottom wall 20, and the mount portions 31 of the other bus bars 29 are disposed on the bottom wall 20. The connection terminals 30 are attached to the projecting pieces 32 of the bus bars 29, and the relays 18 are attached to the relay mounting portions 15 of the upper case 11. Then, while the upper wall 13 is faced with respect to the bottom wall 20, the upper case 11 is overlapped on the lower case 12. The inclined face 19 of the pushing piece 17 then abuts on the positioning plate portion 34 of the bus bar 29a, as shown in FIG. 7.

Then, the upper case 11 is moved towards the lower case 12 to attach these cases 11, 12 to each other. At this time, since the inclined face 19 is inclined to the X-direction so a portion on the inclined face 19 gets away from the positioning wall 22 as it gets closer to the bottom wall 20 of the lower case 12, as described above, the inclined face 19, i.e. the pushing piece 17, pushes the positioning plate portion 34 against the positioning wall 22. Then, once the upper case 11 and the lower case 12 are attached to each other, the pushing piece 17 sandwiches the positioning plate portion 34 between the pushing piece 17 and the positioning wall 22, thereby positioning and attaching the bus bar 29 (29a) to the cases 11, 12, i.e. to the box main body 9.

Thus, the electric junction box 3 is assembled in a manner described above, wherein the wiring unit 10 is received between the upper case 11 and the lower case 12 and the relays 18 are attached to the relay mounting portions 15. Then, by attaching the lower case 12 to the end plate 5, and connecting connection bus bar and connection cable with the bus bars 29, the electric junction box 3 is mounted to the battery assembly 2, thereby constituting the power supply device 1. Furthermore, by engaging the connectors with the connector engagement portions 16, 16a, the electric junction box 3, i.e. the power supply device 1, is mounted to the motor vehicle. The power supply device 1 constituted in a manner described above outputs power of the battery assembly 2 to the inverter via the relays 18, the relays 18 being controlled by ECU mounted to the motor vehicle via a wire harness. Furthermore, the current sensor 24 detects a current value for the power from the battery assembly 2.

According to this embodiment, the lower case 12 includes the positioning wall 22 extending perpendicularly from the central portion of the bottom wall 20 and the peripheral wall 21a extending from the outer edge of the bottom wall 20 and having the cutout portion 23. Furthermore, the bus bar 29 (29a) is provided with the positioning plate portion 34 and the mount portion 31 to be disposed on the bottom wall 20. Consequently, by disposing the mount portion 31 of the bus bar 29a on the bottom wall 20 and moving the positioning plate portion 34 towards the positioning wall 22, the bus bar 29a can be positioned at a proper position at the lower case 12 and attached to the lower case 12. Accordingly, even if the terminal portion 35 in the connector engagement portion 16a is arranged parallel to a direction intersecting with the X-direction (orthogonally, in the shown example) along which the cases 11, 12 are attached to each other in an overlapping relationship, the electric junction box 3 can be assembled easily without a need for dividing the bus bar 29a or using bolts or the like for fixation as well as without increasing the number of components and the manufacturing cost.

Furthermore, the upper case 11 includes the pushing piece 17 pushing the positioning plate portion 34 towards the positioning wall 22. Consequently, the positioning plate portion 34 can be moved towards the positioning wall 22 as the cases 11, 12 are attached to each other. In addition, since the pushing piece 17 sandwiches the positioning plate portion 34 between the pushing piece 17 and the positioning wall 22, the bus bar 29 (29a) can be positioned properly as the cases 11, 12 are attached to each other. Consequently, the electric junction box 3 can be easily assembled without increasing the number of components and the manufacturing cost.

Furthermore, the pushing piece 17 is provided with the inclined face 19 inclined such that a portion on the inclined face 19 gets away from the positioning wall 22 as it gets closer to the bottom wall 20 of the lower case 12. Accordingly, the pushing piece 17 can reliably push the positioning plate portion 34 against the positioning wall 22 as the cases 11, 12 are attached to each other. Consequently, the electric junction box 3 can be assembled even more reliably and easily.

Furthermore, the power supply device 1 includes the electric junction box described above. Consequently, in addition to the electric junction box 3, the power supply device 1 itself can be assembled easily.

The above-described embodiment is only a representative embodiment of the present invention, and the present invention is not limited thereto. That is, various changes can be made without departing the scope of the present invention. For example, in the present invention, the electric junction box 3 may not be directly connected to the battery assembly 2, and the terminal portion 35 may not be arranged perpendicular to the X-direction as long as the terminal portion 35 is arranged to intersect with the X-direction.

What is claimed is:

1. An electric junction box comprising:
a box main body constituted of two case members attached to each other in an overlapping relationship and provided with connector engagement portions to be engaged with connectors; and
a bus bar positioned inside of the connector engagement portion and provided with a terminal portion arranged parallel to a direction perpendicular to a direction along which the two case members are attached to each other in an overlapping relationship,
wherein
one case member of the two case members includes a bottom wall portion, a positioning wall extending perpendicularly from a central portion of the bottom wall portion, and a peripheral wall extending perpendicularly from an outer edge of the bottom wall portion,
the bus bar includes a positioning plate portion connecting to the terminal portion and arranged along the positioning wall and a mount portion connecting to the positioning plate portion and arranged directly on the bottom wall portion, wherein the positioning plate portion extends perpendicularly from the mount portion and the terminal portion of the bus bar, and
the peripheral wall includes a cutout portion allowing the positioning plate portion to move into and out from the one case member.

2. An electric junction box according to claim 1, wherein the other case member of the two case members includes a pushing portion which extends perpendicularly and integrally from an upper wall of the other case member, the other case member forming an outer casing for the electrical junction box, wherein
the pushing portion is arranged such that when attaching the two case members to each other, the pushing portion abuts on the positioning plate portion and pushes the positioning plate portion against the positioning wall, and when the two case members are attached to each other, the positioning plate portion is sandwiched between the pushing piece and the positioning wall.

3. An electric junction box according to claim 2, wherein the pushing portion includes an inclined face, wherein the inclined face being arranged to abut on the positioning plate portion when attaching the two case members to each other, and
wherein the inclined face being arranged to incline so that a portion on the inclined face gets away from the positioning wall as the portion on the inclined face gets closer to the one case member.

4. A power supply device comprising:
a battery assembly having a plurality of batteries connected to each other in series, and
the electric junction box according to claim 3, the electric junction box outputting electric power supplied from the battery assembly to electric equipment.

5. A power supply device comprising:
a battery assembly having a plurality of batteries connected to each other in series, and
the electric junction box according to claim 2, the electric junction box outputting electric power supplied from the battery assembly to electric equipment.

6. A power supply device comprising:
a battery assembly having a plurality of batteries connected to each other in series, and
the electric junction box according to claim 1, the electric junction box outputting electric power supplied from the battery assembly to electric equipment.

* * * * *